United States Patent [19]
Robinson

[11] Patent Number: 5,680,398
[45] Date of Patent: Oct. 21, 1997

[54] MULTICHANNEL RANDOM ACCESS COMMUNICATIONS SYSTEM

[75] Inventor: William Niel Robinson, Farnham, England

[73] Assignee: Motorola, Inc., Schaumburg, Ill.

[21] Appl. No.: 221,218

[22] Filed: Mar. 30, 1994

[30] Foreign Application Priority Data

Apr. 2, 1993 [GB] United Kingdom ............ 9307008

[51] Int. Cl.⁶ .................................................. H04J 3/16
[52] U.S. Cl. .................... 370/458; 370/276; 370/431; 370/437; 455/34.1
[58] Field of Search ............... 370/95.1, 95.2, 370/95.3, 85.13, 110.1, 24, 85.2, 389, 458, 449, 401, 402, 403, 522, 276, 445, 431, 437; 455/34.1, 53.1, 54.1, 54.2, 56.1; 375/211

[56] References Cited

U.S. PATENT DOCUMENTS

| | | | |
|---|---|---|---|
| 4,105,973 | 8/1978 | Arnold et al. | 325/4 |
| 4,612,637 | 9/1986 | Davis et al. | 370/95.3 |
| 5,267,233 | 11/1993 | Bauerschmidt | 370/24 |
| 5,278,835 | 1/1994 | Ito et al. | 370/95.3 |
| 5,331,316 | 7/1994 | Mestdagh et al. | 370/95.3 |
| 5,363,374 | 11/1994 | Zein Al Abedeen et al. | 370/95.3 |
| 5,392,449 | 2/1995 | Shaughnessy et al. | 455/34.1 |
| 5,404,571 | 4/1995 | Makowski | 370/95.3 |
| 5,442,803 | 8/1995 | Furuya | 455/34.1 |
| 5,453,987 | 9/1995 | Tran | 370/95.3 |
| 5,455,822 | 10/1995 | Dixon et al. | 370/95.3 |

FOREIGN PATENT DOCUMENTS 2217955 1/1989 United Kingdom ............ H04J 3/16

*Primary Examiner*—Douglas W. Olms
*Assistant Examiner*—Shick Hom
*Attorney, Agent, or Firm*—Susan L. Lukasik

[57] ABSTRACT

A communications system comprising a central unit (200) and a number of remote units (300) and a downlink (10) for communication from the central unit to the remote units and an uplink (11) for communication from the remote units to the central unit. A signalling channel is provided on the downlink, a plurality of traffic channels are provided on the uplink and signalling information is transmitted on the downlink signalling channel to indicate positively which of one or more of the uplink traffic channels is to be used as a signalling channel for a random access request.

8 Claims, 2 Drawing Sheets

MULTICHANNEL RANDOM ACCESS COMMUNICATIONS SYSTEM

FIELD OF THE INVENTION

This invention relates to a communications system comprising a central unit and a number of remote units and multiple traffic channels and an arrangement for providing random access to the channels. Separately and in addition the invention relates to a central unit and a remote unit of such a system.

BACKGROUND TO THE INVENTION

In trunked radio systems, subscriber radios often gain access to the uplink radio air interface by sending a random access message to the infrastructure. The protocol of the trunked radio system normally includes a common uplink random access channel, which is made available to subscriber radios in a known location in the frequency-division-multiple-access (FDMA) or time-division-multiple-access (TDMA) channel domain.

One of the problems with common random access channels is that as the number of accesses per unit time increases, the likelihood of random access message collision increases. When two or more random access messages collide, it is not possible for the infrastructure receiving the colliding random access messages to correctly capture and decode more than one of the messages, and often, depending on the radio capture effect, none of the colliding messages can be captured and decoded. A random access attempt which is not successfully captured and de-coded is considered to have failed. The probability of random access message failure increases with the random access load.

Failed random access message may be re-tried at a later opportunity, so causing an added delay between the time when the user attempts to access a service and the time the infrastructure receives the request correctly. Re-tries also increase the load on the random access channel, therefore exacerbating the collision problem.

A known technique for reducing the probability of collision is dynamic frame based slotted aloha random access. In this arrangement, an access command is transmitted by a central unit on the downlink indicating that the common control channel on the uplink in the next N slots (e.g. 3 or 4 slots) is available for random access. Units wishing to contend for access receive this access command and randomly choose one of the N uplink common control channel slots for transmitting their access requests. This arrangement has the result that access requests are spread over N frames and are therefore less likely to collide. Another access command is not transmitted on the downlink until N slots have passed. The probability of collision on an uplink common control channel slot is reduced, but this is at the expense of delay, because some units will wait for several slots before transmitting their requests.

In the field of a mobile radio system having a single channel pair, GB-A-2217995 describes a multiple access communications system for data communication between one or more base stations and a number of mobile units. The uplink and downlink are frame based and the frames of the uplink are divided into slots. Predetermined slots of the uplink are desigated as control slots and predetermined slots are designated as data traffic slots. Further predetermined slots of the uplink are designated as special slots which can be used to supplement the data traffic slots or the control slots. The arrangement is somewhat rigid and limited in its usefulness.

In the field of frequency-division multiple-access trunked communication, arrangements are known in which an indication is given on a control channel frequency that one of the traffic channel frequency pairs is to be used as a control channel. Thereafter, remote units can make random access requests on the newly designated control channel and receive channel grant commands on the same designated control channel. This arrangement can be dynamically enabled and disabled to shorten access times during periods of high activity, but only at the expense of tying up uplink and downlink capacity.

When considering trunked radio systems in general, a heavily loaded random access channel achieves an efficiency of approximately 30–40% only, because of the probability of collision. The efficiency of loading is subject to the capture effect and the rules of the random access protocol.

Air interface protocols are generally balanced in that the amount of uplink information is broadly speaking balanced by the amount of downlink information. Also the maximum capacity of the uplink is normally fairly well balanced by the capacity of the maximum downlink capacity.

Because the uplink random access channel is only operating at 30% to 40% efficiency, 60% to 70% of the channel capacity remains un-usable. Because of the balance between the maximum capacities of the uplink and downlink, and the balance of the uplink and downlink protocol, there is over capacity on the downlink. Necessary system broadcast messages usually consume some of this extra downlink capacity, but the downlink still has spare capacity, which could be used if a technique could be developed which would enable the system to accept more random accesses per unit time.

The efficiency of utilisation of the total channel capacity depends on the nature of the traffic. Considering, therefore, a multi-channel system designed for voice traffic but having data capability, as the degree of data usage increases, so the loading on the random access channel will increase faster than the loading on the traffic channels. This is because data messages are generally shorter than voice messages but require the same control channel capacity for channel access. A rigidly designed system, designed for one type of traffic will operate inefficiently if the type of usage changes due to changes in user demand.

Considering now the case of a multisite trunked radio system, a large proportion of the random accesses are due to registration requests, as opposed to voice or data call set-up requests. During the busiest periods, the random accesses due to registration attempts can interfere with the call setup times for the voice or data traffic. If more random accesses could be accommodated per unit time, the average call set-up times would be reduced.

In a scenario where the voice calls are semi-duplex and may use multiple cells, in some cells, the downlink traffic may be occupied by the traffic, but the paired uplink channel may not be in use for traffic. This is particularly true in group call set-ups where one downlink resource is used for each member of the group (broadcasting to the group) but only one uplink resource is used (only one group member transmits at a given time). In a rigidly designed system, an uplink resource is paired with each downlink resource and these uplink resources are under-utilised.

In a scenario where the voice calls are semi-duplex and may involve a line connected terminal as one of the users, the downlink traffic may be occupied by traffic (from the line connected terminal) but the paired uplink channel may not be in use for traffic.

There is a need for an improved random access communications system.

SUMMARY OF THE INVENTION

According to a first aspect of the present invention, communications system is provided comprising a central unit and a number of remote units and a plurality of frequency divided downlink resources for communication from the central unit to the remote units and a plurality of frequency divided uplink resources for communication from the remote units to the central unit wherein a signalling channel is provided on one of the downlink resources, a plurality of traffic channels are provided on the uplink resources and means are provided for transmitting signalling information on the downlink signalling channel indicating positively which of one or more of the plurality of frequency divided uplink resources is to be used as a signalling channel for a random access request independent of downlink resource allocation.

Thus any available uplink resource on any of the available frequency divided resources can be temporarilty assigned for random access channel capacity.

The uplink resource is not necessarily paired with any given downlink resource.

Where the system is a TDMA system, it is preferred that the one or more of the uplink traffic channels reside on slots which are separated in time from the downlink signalling slot by a transmit-receive switching delay.

The invention also relates to a central unit per se and a remote unit per se, as defined in the claims.

In accordance with a second aspect of the invention, a communications system is provided comprising a central unit and a number of remote units and a downlink for communication from the central unit to the remote units and an uplink for communication from the remote units to the central unit wherein: a signalling channel is provided on the downlink, a plurality of traffic channels are provided on the downlink and a plurality of traffic channels are provided on the uplink, paired with the traffic channels on the downlink, and means are provided for assigning an uplink traffic channel and a paired downlink traffic channel for duplex communication with a mobile radio, the central unit further comprising a wired input for receiving traffic from a source external to the central unit and means are provided, responsive to receipt of traffic via the wired connection, for transmitting said traffic on a downlink traffic channel and for transmitting signalling information on the downlink signalling channel to indicate positively that the uplink traffic channel paired with said downlink traffic channel is to be used as a signalling channel for a random access request.

Thus, in a scenario where the voice calls are semi-duplex and may use multiple cells, in some cells, the downlink traffic may be occupied by the traffic, and the paired uplink channel can be used for random access requests. Also, in a scenario where the voice calls are semi-duplex and may involve a line connected terminal as one of the users, the downlink traffic may be occupied by traffic (from the line connected terminal) but the paired uplink channel can be used for random access requests.

In accordance with a third aspect of the invention, a communications system is provided comprising: a central unit, a number of remote units, a downlink for communication from the central unit to the remote units, said downlink having a signalling channel and an uplink for communication from the remote units to the central unit, said uplink having a plurality of traffic channels, wherein the uplink and downlink are time divided in a TDMA protocol to provide uplink signalling and traffic slots and downlink signalling and traffic slots and wherein means are provided in the central unit for transmitting signalling information on the downlink signalling channel to indicate positively which of one or more of the uplink traffic channels is to be used as a signalling channel for a random access request, and wherein control means are provided at the central unit, arranged to allocate traffic slots on the uplink to be used as a traffic channel, so as to optimise the availability of other preferred traffic slots on the uplink for signalling purposes.

Thus, in the case of a TDMA system the central unit organises the allocation of traffic slots on the uplink so as to reserve, where possible, the optimum traffic channels for use as signalling channels.

A preferred embodiment of the invention will now be described, by way of example, with reference to the drawings.

DETAILED DESCRIPTION OF THE PREFERRED EMBODIMENTS

Figure 1:
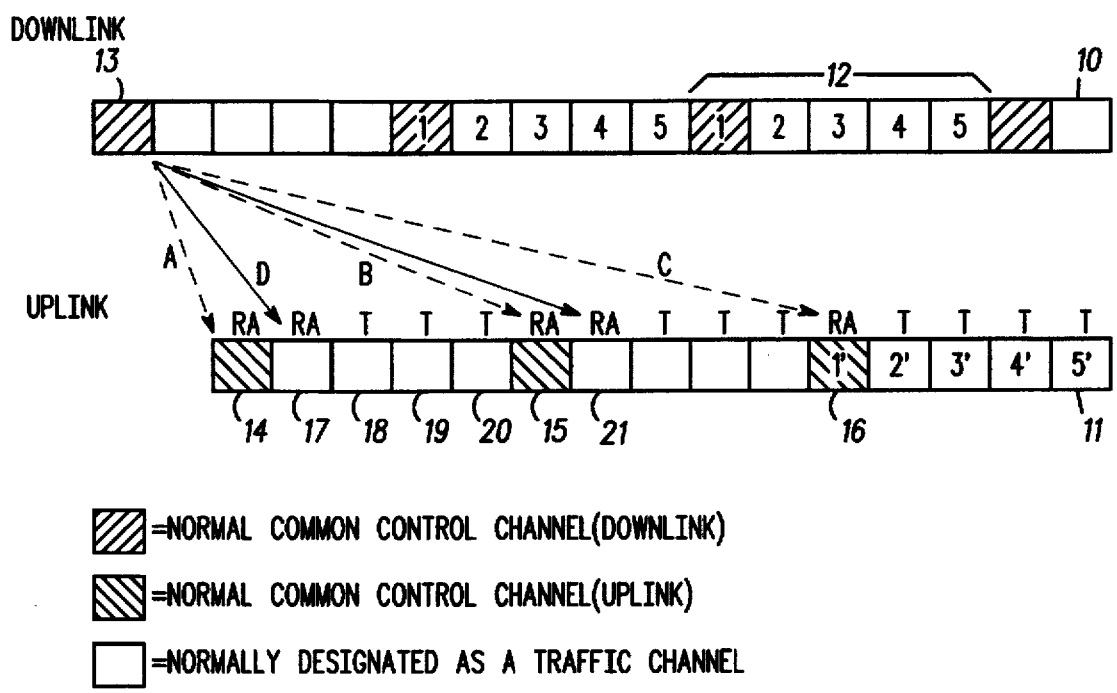
FIG. 1 shows a timeslot arrangement of downlink and uplink channels of a TDMA communications system in accordance with the invention.

Referring to FIG. 1, the example will be described of a TDMA system incorporating the invention and in the figure, are shown a downlink (central-to-remote) and an uplink (remote-to-central) of such a system. The downlink 10 and uplink 11 are on different frequencies, there are several further links, particularly several further uplinks on further frequencies not shown.

The downlink 10 is divided into frames 12 of five slots per frame. These are labelled 1–5. The first slot 13 of a frame is a common control channel. The common control channel timeslots are illustrated by shading. It will, of course, be understood that the carrier could be divided into six or indeed a large number of channels.

The uplink 11 is also divided into frames of five slots (1'–5') per frame. The first slot 14, 15, 16 of a frame is again a common control channel and is again illustrated by shading. All the other (paired) slots on the uplink and the downlink are normally considered to be traffic channels 2–5.

It may be noted that the control channel timeslots on the uplink are offset vis-a-vis those on the downlink. The uplink control channel timeslots occur two slots after the downlink control channel timeslots, so that a command can be sent from the central to the remote and the remote can respond quickly with signalling in the next immediately following uplink control channel slot. Furthermore, sufficient time is provide for the remote unit to switch from receiving on the downlink frequency to transmitting on the uplink frequency between these control channel timeslots.

In the figure, the arrow A illustrates the switching of a remote unit from receiving an access command in downlink control channel slot 13 to transmitting a random access request RA in uplink control channel timeslot 14.

As has been explained, in dynamic frame bases slotted aloha random access, a random access command is transmitted in slot 13 informing the remote units that slots 14, 15 and 16 can all be used for a random access request. These are illustrated by dashed arrows A, B and C.

In accordance with this embodiment of the invention, a new access command is transmitted on the downlink controlled channel timeslot 13 informing remote units that not only can control channel slot 14 be used for random access but also that a traffic channel timeslot 17 can be used. This is illustrated by arrow D. Thus, on sending this new command, slots 14 and 17 become available for random access whilst slots 18, 19 and 20 remain as traffic slots.

It is to be noted for semi-duplex equipment, that slot 17 is the preferred slot for an additional random access slot, because arrow D provides adequate time for switching from receiving on the downlink to transmitting on the uplink and there is also adequate time to switch back to receiving on the downlink to receive the next immediately following control channel timeslot on the downlink. By contrast, slots 18 and 20 are less preferred as they provide insufficient time for switching to and from the next immediately following downlink control channel timeslot, while slot 19 is particularly unsuitable, because it coincides with a downlink control channel timeslot.

Traffic slots on another frequency carrier (not shown) can be allocated as signalling slots.

In this manner, the unused uplink capacity resulting from the unused uplink traffic channel represented by slot 17 is dynamically reconfigured as a temporary additional common access random channel and can be used to increase the capacity of the common random access channel and therefore increase numbers of random accesses per unit time that can be successfully received. Moreover, no additional delay is introduced, because the remote unit can transmit its random access request and immediately switch back to receive the next immediately following downlink control channel slot in order to receive a control channel grant command if the random access has been successful.

While not essential to the invention, the idea of the invention can be combined with features of dynamic frame based slotted aloha random access by further providing information in the access command transmitted in downlink control channel slot 13 indicating that not only can traffic slot 17 be used for random access but also traffic slot 21 in the next immediately following frame. This arrangement provides some of the benefit of dynamic frame based slotted aloha random access with some of the benefit of the present invention. Over the two frames in question, four slots have been made available for random access requests, thereby spreading potential contending units over four different slots. Clearly those users that randomly select slots 15 and 21 for access requests have a single-frame delay introduced in their access. Nevertheless, this is an improvement on two or three frames delay.

Figure 2:
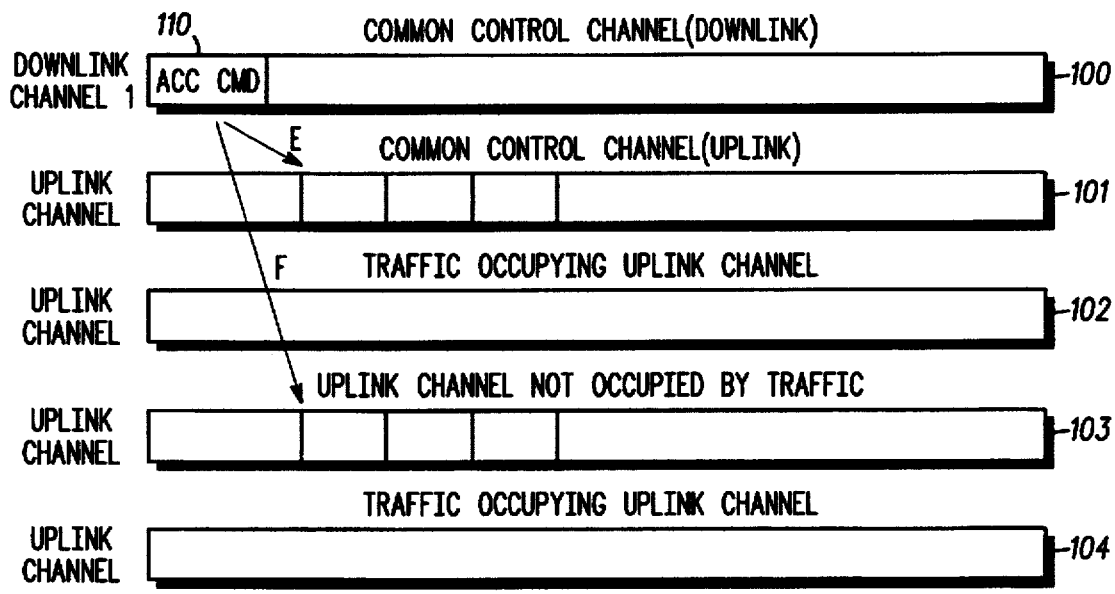
FIG. 2 shows control channels and traffic channels of an FDMA system in accordance with the invention.

Referring now to FIG. 2, a further embodiment of the invention is explained in the context of an FDMA system, such as MPT1327. In the figure, a downlink common control channel 100 is shown, together with a uplink common control channel 101, an uplink traffic channel 102 occupied by traffic, an uplink traffic channel 103 not occupied by traffic and an uplink traffic channel 104 occupied by traffic. The system is fairly heavily loaded, as channels 102 and 104 are both occupied.

In the downlink common control channel 100 there is transmitted from time to time an access command 110. This command includes information instructing remote units that, in addition to normal common control channel 101, traffic channel 103 can be used for random access request (i.e. signalling). This is illustrated by arrows E and F. Any units wishing to transmit receive access command 110 and receive the information that they are free to use either of channels 101 and 103 for random access requests and randomly select one of these channels, switching (by means of control lines 312) to the particular frequency selected and transmitting a request for a channel grant. The central unit receives the request for channel grant and, if there is no collision, it responds with a channel grant command in downlink channel 100.

In both arrangements of FIG. 1 and FIG. 2, various known procedures can be used in the event of a collision. Thus, if a remote unit recognises that it has not received a channel grant command in response to a request, it assumes that this is due to a collision and, for example, introduces a random delay before making a new request. In this manner, different colliding units have the opportunity of selecting different delays and avoiding collision on second attempt. Other known schemes for recovering from collision can be used.

Figure 3:
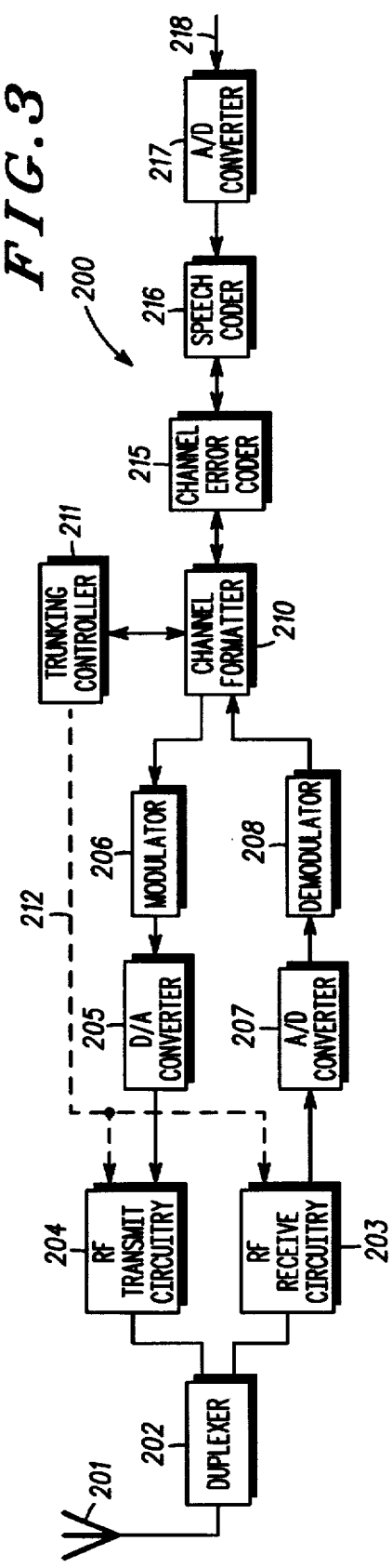
FIG. 3 shows a block diagram of a central unit in accordance with the invention and FIG. 4 shows a block diagram of a remote unit in accordance with the invention.
Figure 4:
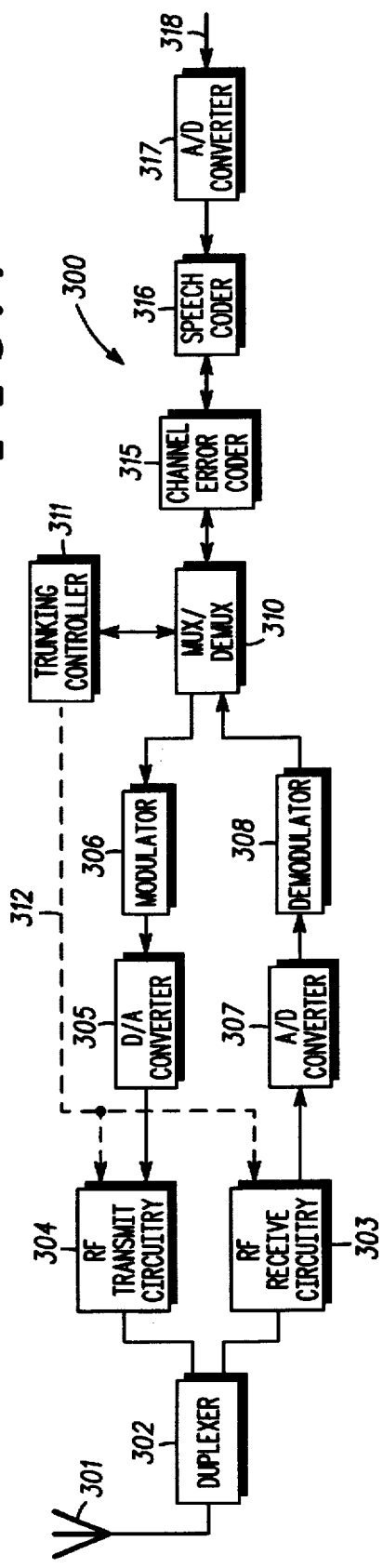

Referring now to FIG. 3, a central unit (base station) 200 of a trunked radio system is shown comprising an antenna 201, a duplexer 202, RF receive circuitry 203 and RF transmit circuitry 204. Connected to the transmit circuitry 204 is a D-A converter 205 and a modulator 206. Connected to the RF circuitry 203 is an A-D converter 207 and a demodulator 208. The demodulator 208 and modulator 206 are connected to a channel formatter 210, which is in turn connected to a trunking controller 211. Also connected to the channel formatter 210 is a channel error coder 215, in turn connected to a speech coder 216 and an A/D converter 217. The antenna 201 communicates with a mobile or remote unit which is illustrated in FIG. 4 and described below. In use, analog speech can be input from a dispatcher (not shown) or a telephone line 218 via A/D converter 217, encoded in speech coder 216 and output on a traffic channel by means of channel formatter 210 and RF transmit circuitry 204. Similarly, speech traffic is received in a traffic channel through receive circuitry 203 and passed via channel formatter 210 to speech coder 216 for outputting through a loudspeaker or to a telephone line. Other connections can, of course, be set up such as mobile-to-mobile communication via channel formatter 210 not involving speech coder 216.

Trunking controller 211 controls the allocation of traffic channels (e.g. timeslots) to different users using the system. In relatively heavily loaded conditions, trunking controller 211 transmits access commands by outputting these to the channel formatter 210 for transmission in the downlink common control channel slots. These access commands are broadcast commands i.e. not addressed to specific units, and include one or more traffic channel indicators indicating which traffic channels may be used for signalling. If a signal is received on a traffic channel that has been designated as a signalling channel, channel formatter 210 routes this signal to trunking controller 211 instead of routing it to channel error coder 215 (or to any other traffic destination).

A preferred feature performed by trunking controller 211 is as follows. When allocating channels to remote units, trunking controller 211 selects the second, third and fourth channels (i.e. those channels represented by timeslots 18, 19 and 20) for allocation in preference to allocating the first channel carried by the first timeslot immediately following the uplink common control channel (i.e. that represented by timeslot 17). In this manner, timeslot 17 is, to some degree, reserved for use as signalling if necessary. Of course, the trig controller 211 does not deny access if timeslot 17 is required for use. On the other hand, trunking controller 211 can be selective in when it allocates timeslot 17 for traffic. Thus, in the event that a remote unit requests grant for a data call (the nature of the call being indicated in the request for access) trunking controller 211 can decide to delay this data call until one of the other channels becomes available. This is because a data call is likely to have a longer duration and "tie up" the first channel for a long time. In addition, or alternatively, trunking controller 211 can cause a handover of a call from the first channel to one of the other channels when one of those channels becomes available, thus freeing up timeslot 17.

Referring to FIG. 4, a mobile radio is shown having elements 301–308 which are broadly similar to elements 201–208 of the central unit (except that the transmitter circuitry 304 has lower power) and which has elements 315–317 similar to elements 215–217 of the central unit. Connected to the modulator 306, demodulator 308 and channel error coder 315 is a multiplexer/demultiplexer 310, which in turn is connected to a controller 311. Multiplexer/demultiplexer 310 sorts received signals into control signals, which it directs to the controller 311 and traffic signals intended for the remote in question, which it routes to the channel error coder 315. Multiplexer/demultiplexer 310 also receives signalling from controller 311, which it transmits on an appropriate timeslot via transmit circuitry 304.

When an access command is received from a central unit via receive circuitry 303, this is routed by multiplexer/demultiplexer 310 to controller 311 because it is received in a common control channel timeslot. If this signalling contains an access command indicating that a further timeslot on the uplink can be used for signalling, the operation is as follows. On pressing the push-to-talk (not shown), controller 311 selects either the normal common control channel timeslot or the newly assigned traffic timeslot for a random access request and sends the request to the multiplexer/demultiplexer 310, with an indication as to which timeslot it is to be transmitted on. Multiplexer/demultiplexer 310 causes the access request to be transmitted via transmit circuitry 304 on the appropriate timeslot.

Multiplexer/demultiplexer 310 routes the next immediately following control channel timeslot from the downlink which is received in receive circuitry 303 to controller 311. If controller 311 identifies a "go to channel" command from this signalling, it instructs multiplexer/demultiplexer 310 to commence routing speech or other signals from channel error coder 315 to transmitter 304 on the appropriate channel. If no "go to channel" command is received, controller 311 attempts a retry in a manner known in the art.

The location of the temporary additional common random access channel is signalled on the downlink using the spare downlink common control capacity which is normally available with most relatively balanced protocols such as MPT1327.

The temporary additional common random access channel can be included in the frame of any frame based slotted aloha mechanism.

This technique can be used to increase the maximum number of random accesses per unit time that can be correctly received by the infrastructure, so that the capacity of the uplink common random access channel is no longer the limiting factor of the common control channel capacity.

This technique exploits unused uplink capacity that may be available. In the TDMA domain, there will probably be some TDMA slots which cannot be exploited by semi-duplex equipment for the temporary additional common random access channel because of the switching time needed between the transmit slot and the receive slot.

As stated above, in a scenario where the voice calls are semi-duplex and may use multiple cells, in some cells, the downlink traffic may be occupied by the traffic, but the paired uplink channel may not be in use for traffic. A first, second and third base stations are connected by wire-lines.

A first base station is communicating with a first remote unit (mobile) and second and third base stations are communicating with second and third mobiles. The first base station is arranged for duplex communication over channel pairs {M,m} and {N,n}. Similarly the second and third base stations are arranged for duplex communication over channel pairs {P,p}, {Q,q} and {S,s}, {T,t} respectively.

The first remote unit is currently transmitting traffic over uplink traffic channel m. This traffic is transmitted to the second and third mobiles over downlinks P and S respectively. It can be seen that to support the conversation, one uplink traffic channel is required and two downlink traffic channels. There is an imbalance in channel usage and the controller of the second base station, recognising that its outbound traffic is coming from the wire-line, uses control channel Q to instruct other remote units in its coverage area to switch to traffic channel p for transmission of access requests.

Thus in group call set-ups where one downlink resource is used for each member of the group (broadcasting to the group) but only one uplink resource is used (only one group member transmits at a given time), the excess uplink capacity is used for random access. By contrast, in a rigidly designed system, an uplink resource is paired with each downlink resource and these uplink resources are under-utilised.

As stated above, in a scenario where the voice calls are semi-duplex and may involve a line connected terminal as one of the users, the downlink traffic may be occupied by traffic (from the line connected terminal) but the paired uplink channel may not be in use for traffic.

A dispatcher is connected to the wire-line and the first base station. Traffic emanating from the dispatcher is transmitted to the first mobile over a downlink channel M, leaving uplink traffic channel m free for assignment as a temporary control channel for access requests from other mobiles.

I claim:

1. A method of operating a communications system wherein the communications system comprises:
   a central unit having a transmitter;
   a number of remote units;
   a plurality of frequency divided downlink resources for communication from the central unit to the remote units including a signalling channel provided on one of the downlink resources; and
   a plurality of frequency divided uplink resources for communication from the remote units to the central unit; the method comprising the steps of:
   transmitting on the downlink signalling channel, signalling information indicating which of one or more of the plurality of frequency divided uplink resources is to be used as a signalling channel by at least one remote unit for a random access request, independent of downlink resource allocation by the central unit.

2. The method of claim 1, wherein the downlink resources and the uplink resources are grouped together as resource pairs and a resource pair is allocated for communications between the central unit and at least one remote unit.

3. A method of operating a communications system wherein the communications system comprises:

a central unit;

a number of remote units;

a plurality of frequency divided pairs each including an uplink resource for communication from the remote units to the central unit and a respective downlink resource for communication from the central unit to the remote units; the method comprising the steps of:

transmitting on a downlink resource signalling information indicating which of one or more of the uplink resources is to be used, independent of the respective paired downlink resource allocation, as a signalling channel by at least one remote unit for a random access request.

4. The method of claim 1, wherein the at least one remote unit comprises a receiver and a transmitter, the method further comprising the steps of:

receiving the signalling information by the receiver of the at least one remote unit;

transmitting a random access request by the at least one remote unit on said one or more of the plurality of frequency divided uplink resources, independent of downlink resource allocation.

5. A method of transmitting a random access request in a communications system comprising a central unit, a number of remote units, a downlink for communication from the central unit to the remote units and an uplink for communication from the remote units to the central unit, wherein a signalling channel is provided on the downlink, a plurality of traffic channels are provided on the downlink and a plurality of traffic channels are provided on the uplink, paired with the traffic channels on the downlink, and wherein the central unit comprises a controller and a wired input, the method comprising the steps of:

assigning an uplink traffic channel and a paired downlink traffic channel by the controller for duplex communication between at least one remote unit and the central unit;

receiving, at the central unit via the wired input, traffic from a source external to the central unit;

transmitting said traffic on a downlink traffic channel from the central unit to the at least one remote unit;

transmitting signalling information on the downlink signalling channel from the central unit to the at least one remote unit and indicating positively, in the signalling information, that the uplink traffic channel paired with said downlink traffic channel is to be used as a signalling channel for a random access request.

6. The method of claim 5, wherein the at least one remote unit comprises a receiver and a transmitter, the method further comprising the steps of:

receiving the signalling information by the receiver of the at least one remote unit;

transmitting a random access request by the at least one remote unit on said paired uplink traffic channel.

7. The method of claim 1, wherein the uplink and downlink resources are time divided in a TDMA protocol.

8. The method of claim 1, further comprising the step of allocating traffic slots by the controller on the uplink to be used as a traffic channel, so as to optimize the availability of other preferred traffic slots on the uplink for signalling purposes.

* * * * *